(12) United States Patent
Yura

(10) Patent No.: US 11,048,235 B2
(45) Date of Patent: Jun. 29, 2021

(54) CONTROLLER OF MACHINE TOOL

(71) Applicant: OKUMA Corporation, Aichi (JP)

(72) Inventor: Motozumi Yura, Aichi (JP)

(73) Assignee: OKUMA CORPORATION, Aichi (JP)

( * ) Notice: Subject to any disclaimer, the term of this patent is extended or adjusted under 35 U.S.C. 154(b) by 0 days.

(21) Appl. No.: 16/701,534

(22) Filed: Dec. 3, 2019

(65) Prior Publication Data

US 2020/0183361 A1 Jun. 11, 2020

(30) Foreign Application Priority Data

Dec. 5, 2018 (JP) .............................. JP2018-227848

(51) Int. Cl.
*G05B 19/4155* (2006.01)
(52) U.S. Cl.
CPC ............ *G05B 19/4155* (2013.01); *G05B 2219/34013* (2013.01)
(58) Field of Classification Search
CPC .............. G05B 19/4155; G05B 19/406; G05B 2219/34013; G05B 2219/50083
See application file for complete search history.

(56) References Cited

U.S. PATENT DOCUMENTS

| 5,814,956 | A * | 9/1998 | Kono | ............... | G05B 19/4063 |
| | | | | | 318/380 |
| 8,030,187 | B2 * | 10/2011 | Sasaki | ............... | H01L 21/2236 |
| | | | | | 438/480 |
| 2011/0234141 | A1 | 9/2011 | Kataoka et al. | | |
| 2013/0187589 | A1 * | 7/2013 | Okita | ............... | G05B 9/02 |
| | | | | | 318/566 |
| 2014/0132194 | A1 * | 5/2014 | Okita | ............... | B23Q 5/58 |
| | | | | | 318/563 |
| 2016/0087558 | A1 | 3/2016 | Yamamoto | | |
| 2017/0310268 | A1 | 10/2017 | Tanaka et al. | | |

FOREIGN PATENT DOCUMENTS

| JP | 2011209936 A1 | 10/2011 |
| JP | 2016063705 A1 | 4/2016 |
| JP | 2017200264 A | 11/2017 |

* cited by examiner

*Primary Examiner* — Rina I Duda
(74) *Attorney, Agent, or Firm* — Cantor Colburn LLP

(57) ABSTRACT

In a controller of a machine tool having a converter that converts an AC power supply to DC and a plurality of inverters that drive a feed axis and a spindle, a power outage preparation mode is judged when an AC power supply voltage becomes lower than a predetermined value, and power outage is judged when the power outage preparation mode continues for a time period exceeding a predetermined time period or when a DC voltage which is output from the converter becomes lower than $V_{AL1}$. During the power outage preparation mode, a threshold $V_{AL2}$ of a low voltage alarm provided at each inverter is changed to a value lower than $V_{AL1}$. In addition, when the power outage is judged, a stopping operation or a retracting operation of the feed axis is executed.

2 Claims, 6 Drawing Sheets

CONTROLLER OF MACHINE TOOL

CROSS REFERENCE TO RELATED APPLICATION

The present application claims priority under 35 USC 119 to Japanese Patent Application No. 2018-227848 filed on Dec. 5, 2018, which is incorporated herein by reference in its entirety including the specification, claims, drawings, and abstract.

TECHNICAL FIELD

The present disclosure relates to improvement of a controller which drives a feed axis and a spindle of a machine tool, and in particular to control during power outage.

BACKGROUND

In machine tools, a workpiece is machined to a predetermined shape by controlling the workpiece or a tool. For example, in a machining center or the like, a spindle on which a tool is attached is rotationally driven by a spindle motor, and a feed axis for moving the workpiece and the tool (spindle) is linearly or rotationally driven by a servo motor via a ball screw, a gear, or the like.

FIG. 5 is a block diagram showing a structure of a controller of related art described in JP 2011-209936 A. An AC (alternating current) voltage supplied by an AC power supply 1 is input to a converter 2. The converter 2 converts the AC voltage which is input to a DC (direct current) voltage, and supplies the converted voltage to feed axis inverters 3 and 4 and a spindle inverter 5. A numerical controller 6 inputs a position command value or a velocity command value to the feed axis inverters 3 and 4 and the spindle inverter 5, to machine a workpiece in a predetermined shape. The feed axis inverters 3 and 4 and the spindle inverter 5 drive servo motors 7 and 8 and a spindle motor 9, respectively, according to the command values from the numerical controller 6.

If no countermeasure is taken during power outage, because the feed axis inverters 3 and 4 and the spindle inverter 5 consume DC power, a DC bus voltage is reduced, and control of the motor cannot be maintained. As a result, it becomes difficult to control a tool trajectory as designated. In consideration of this, in the apparatus of JP 2011-209936 A, the tool is retracted from the workpiece (machining target) and stopped during the power outage, so that damages to the workpiece and the tool are prevented.

FIG. 6 is a block diagram of a controller of related art described in JP 2016-063705 A. Many power outages are instantaneous voltage reductions which are of short duration, and, because in many cases an operation state of the machine tool is a low load, in many cases the DC bus voltage is not reduced with the instantaneous voltage reduction. Thus, in this apparatus of the related art, a protection operation start judgment unit 17 does not start a protection operation such as stopping or retraction when a DC voltage detection value is not reduced, and an inverter 3 which drives a motor 7 continues to be operated.

Further, JP 2017-200264 A discloses that, in the controller targeted to not perform the protection operation during the instantaneous voltage reduction as shown in FIG. 6, a plurality of power outage detection signals which use a plurality of power outage detection conditions are generated in correspondence to combinations of a plurality of devices having different power outage endurances, and start of an appropriate protection operation for each device is controlled.

With the technique of the related art described in JP 2011-209936 A shown in FIG. 5, it becomes possible to completely stop the machine tool while preventing damages of the tool and the workpiece during the power outage. However, the machining is interrupted by the retracting operation even in the instantaneous voltage reduction which occurs in many of the power outages, and, thus, the reduction of productivity is problematic.

In the techniques of related art described in JP 2016-063705 A and JP 2017-200264 A, it becomes possible to continue the operation without interrupting the machining in the instantaneous voltage reduction during a low-load operation in which the DC bus voltage is not reduced. However, because the operation is not continued in cases where a machining load is large and the DC bus voltage is reduced, reduction of the productivity in this case is problematic. Further, in these techniques of the related art, if a DC bus voltage alarm level for judging the power outage is set low in advance, it may be possible to continue the operation until the DC bus voltage is reduced to the set level. However, when the DC bus voltage alarm level is set low, a voltage reduction due to deficiency of a DC bus wiring connecting a plurality of inverter units or the like cannot be detected in each inverter, and there is a problem in that accidents or failures may be caused due to excessive heating.

SUMMARY

According to one aspect of the present disclosure, there is provided a controller of a machine tool, comprising: a converter that converts an alternating current power supply voltage to a direct current voltage and that outputs the converted voltage to a direct current bus; a plurality of inverters that convert the direct current voltage which is supplied from the converter into an alternating current and that drive a plurality of feed axis motors and a spindle motor; an alternating current voltage detection circuit that detects a voltage value of an alternating current power supply which is input to the converter; a first direct current voltage detection circuit that detects a direct current voltage which is output from the converter; a second direct current voltage detection circuit that is provided at each of the plurality of inverters and that detects a direct current voltage which is input; a low voltage alarm judgment unit that is provided at each of the plurality of inverters and that detects an alarm when a detection value of the second direct current voltage detection circuit becomes lower than a threshold $V_{AL2}$; a power outage preparation judgment unit that judges a power outage preparation mode when a power supply voltage value detected by the alternating current voltage detection circuit becomes lower than a predetermined value; and a power outage judgment unit that judges power outage when a detection value of the first direct current voltage detection circuit becomes lower than a predetermined threshold $V_{AL1}$ while the power outage preparation judgment unit judges the power outage preparation mode, or when a state of judgment of the power outage preparation mode is continued for a time period exceeding a predetermined time period, and that commands a stopping operation or a retracting operation of a feed axis to the plurality of inverters, wherein the threshold $V_{AL2}$ at the low voltage alarm judgment unit is switched from a value during a normal time to a value lower than the threshold $V_{AL1}$ at the first direct current voltage detection circuit during a time period in which the power outage preparation judgment unit judges the power outage preparation mode.

According to another aspect of the present disclosure, during a period in which the power outage preparation judgment unit judges the power outage preparation mode, in the plurality of inverters, a motor output is limited to a output reduction rate $P_{Lim}$ given by the following Equation (1) according to a difference between a detection value $V_{DC}$ of the second direct current voltage detection circuit and an output limit voltage $V_{PL}$ which satisfies a relationship of $V_{PL} > V_{AL1}$:

$$P_{Lim} = K_L(V_{DC} - V_{PL}) \quad (1)$$

wherein $0 \leq P_{Lim} \leq 1$, and $K_L$ is an arbitrary constant.

BRIEF DESCRIPTION OF DRAWINGS

Embodiment(s) of the present disclosure will be described based on the following figures, wherein.

DESCRIPTION OF EMBODIMENTS

Figure 1:
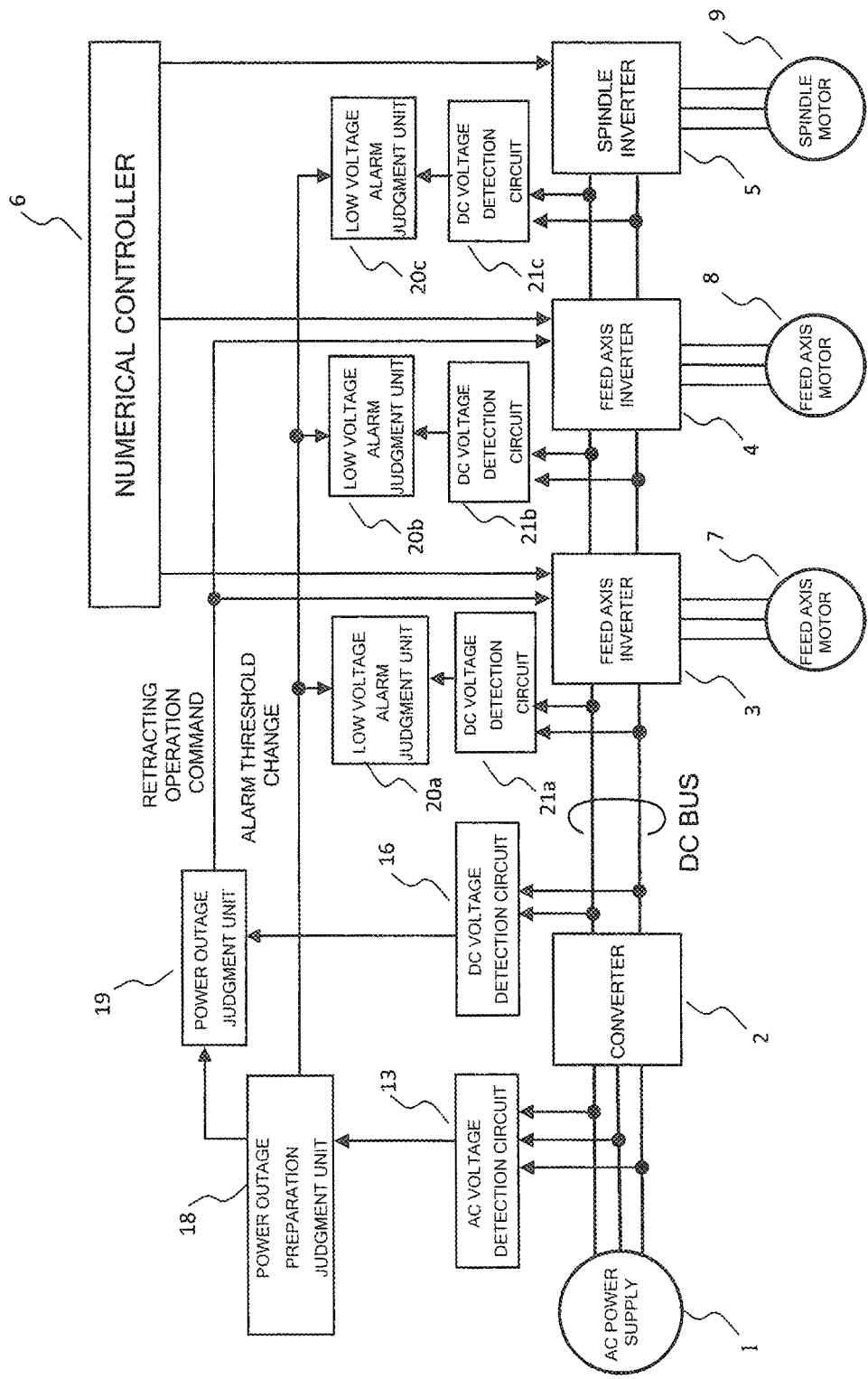
FIG. 1 is a block diagram showing an embodiment of the present disclosure.
Figure 5:
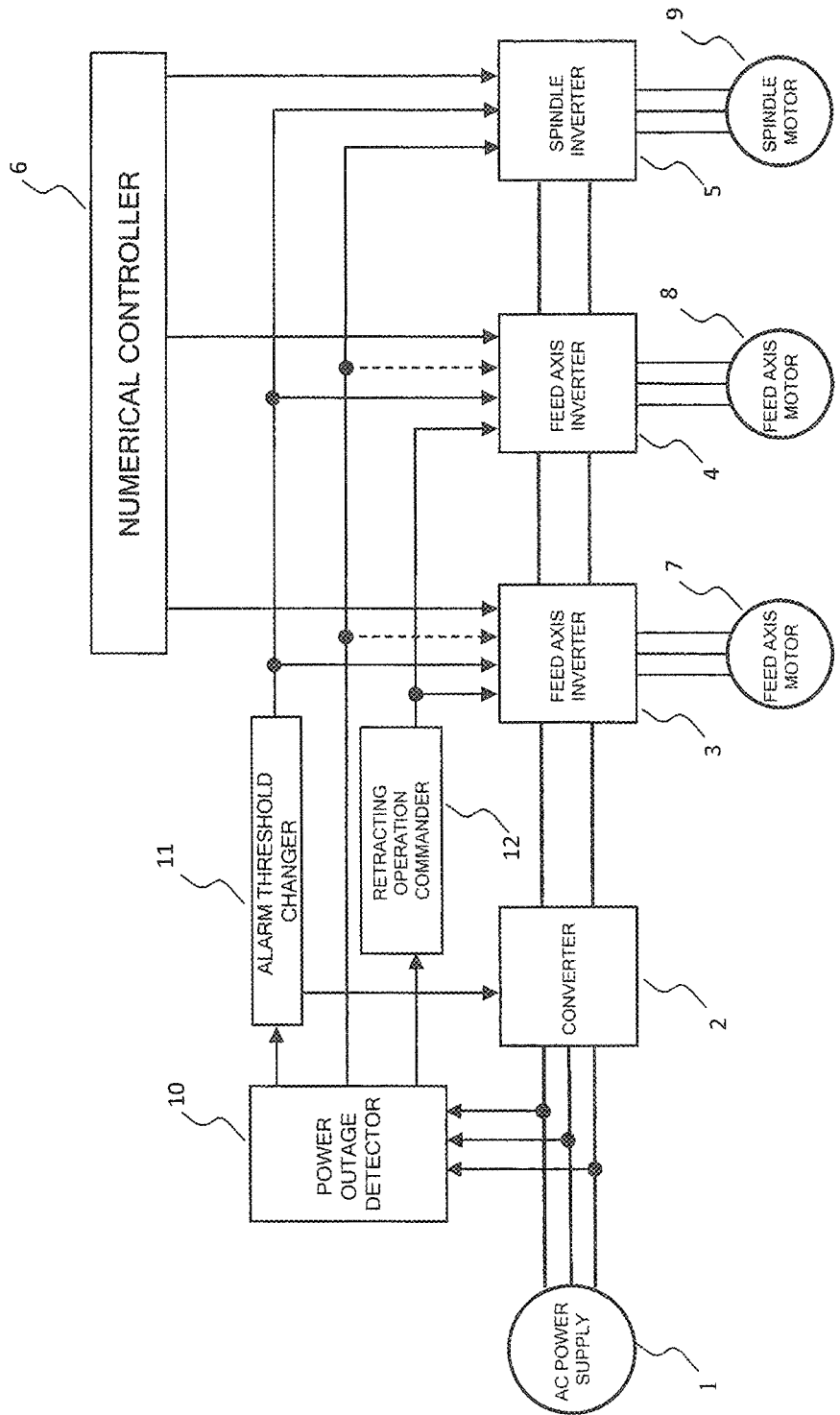
FIG. 5 is a block diagram showing a controller of a machine tool according to related art.
Figure 6:
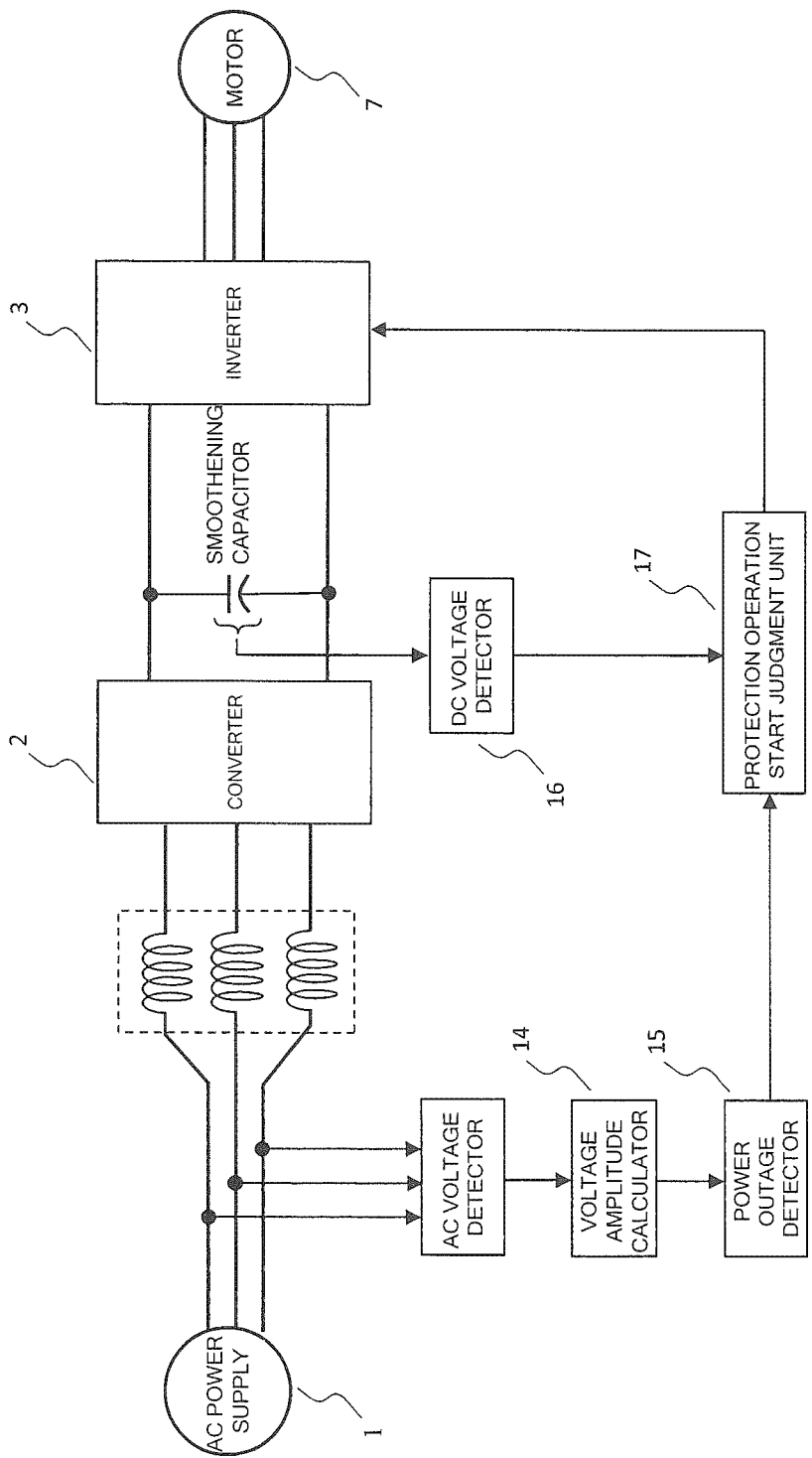
FIG. 6 is a block diagram showing a controller of another machine tool according to related art.

FIG. 1 is a block diagram showing an apparatus according to an embodiment of the present disclosure. Elements identical to those of the related art shown in FIG. 5 and FIG. 6 are assigned the same reference numerals, and will not be described again. In addition, for the purpose of simplification, there will be described a structure having two feed axis motors and one spindle motor, but the present disclosure is not limited to such a configuration.

An AC voltage detection circuit 13 detects an AC power supply voltage which is input to a converter, and outputs the detected voltage to a power outage preparation judgment unit 18. The power outage preparation judgment unit 18 judges a current operation mode of the apparatus to be a power outage preparation mode when the power supply voltage is reduced to a predetermine value or lower, and outputs a power outage preparation mode signal to a power outage judgment unit 19 and commands a change of an alarm threshold to low voltage alarm judgment units 20a, 20b, and 20c provided on the feed axis inverters 3 and 4 and the spindle inverter 5.

The low voltage alarm judgment units 20a, 20b, and 20c and the alarm threshold $V_{AL2}$ will now be described. When the AC power supply is converted to DC by a full-wave rectifier circuit, a DC voltage $V_{DC}$ is:

$$V_{DC} = \sqrt{2} \times V_{rms}$$

with respect to an effective value $V_{rms}$ of the AC power supply voltage. For example, for a power supply based on 200V, the DC voltage is approximately 283V. Typical inverters are designed presuming the DC voltage of 283V, and the motor cannot be appropriately controlled when the DC voltage is reduced. Thus, normally, for example, the threshold $V_{AL2}$ is set to about −20∼−30%.

In addition, in usages which use a plurality of motors such as in machine tools, generally, a plurality of inverters are connected by a DC bus. When connection deficiency occurs in the DC bus wiring, heat may be generated in the deficiency portion, and burnout accidents may occur. Therefore, the low voltage alarm judgment unit is provided on each of the inverters.

During a period when the power outage preparation judgment unit 18 judges the power outage preparation mode, because the power supply voltage is reduced, there is a possibility that the DC bus voltage may be reduced to a voltage lower than a normal low voltage alarm level. However, statistically, it is known that most of the instantaneous voltage reduction takes place for a few ms to 100 ms, and, with such a short time, position control of the feed axis and velocity control of the spindle motor are almost unaffected. Thus, in the power outage preparation mode, the low voltage alarm threshold $V_{AL2}$ is changed to a low value satisfying $V_{AL1} > V_{AL2}$, to permit reduction of the DC bus voltage. $V_{AL1}$ will be described later in detail.

The power outage judgment unit 19 judges power outage when the power outage preparation mode continues for a predetermined period of time (for example, 100 ms), or when the detection value of a DC voltage detection circuit 16 becomes a value below the predetermined value $V_{AL1}$, and commands a retracting operation or stoppage to the feed axis inverters 3 and 4.

When the low voltage alarm judgment unit 20a or 20b individually detects a low voltage alarm for the feed axis inverter 3 or 4 in the power outage preparation mode, there is a possibility that, due to a difference in timings of detection, an operation trajectory of the tool deviates from a commanded trajectory, resulting in possible damages to the workpiece and the tool. Specifically, when the low voltage alarm is detected for a voltage which is input to a certain feed axis inverter, the numerical controller 6 stops the feed axis inverter, and the feed axis motor driven by the inverter is stopped. If there is a time difference in detection of the low voltage alarms for two feed axis inverters 3 and 4 in the exemplary configuration, one of the feed axis motors 7 and 8 first stops, and then, with elapse of a certain time, the other of the feed axis motors 7 and 8 stops. When there is such a time difference in stopping of the feed axis motors 7 and 8, there is a possibility of a situation where the operation trajectory of the tool is deviated from the commanded trajectory.

Thus, during the power outage preparation mode, the low voltage alarm threshold $V_{AL2}$ is set to a value lower than the threshold $V_{AL1}$ with which the power outage judgment unit 19 judges the power outage. With this configuration, the timing for the retracting operation or the stop operation can be collectively controlled by the power outage output of the power outage judgment unit 19, the plurality of feed axes can operate in synchronization with each other, and the tool trajectory does not deviate from the commanded trajectory.

Figure 2:
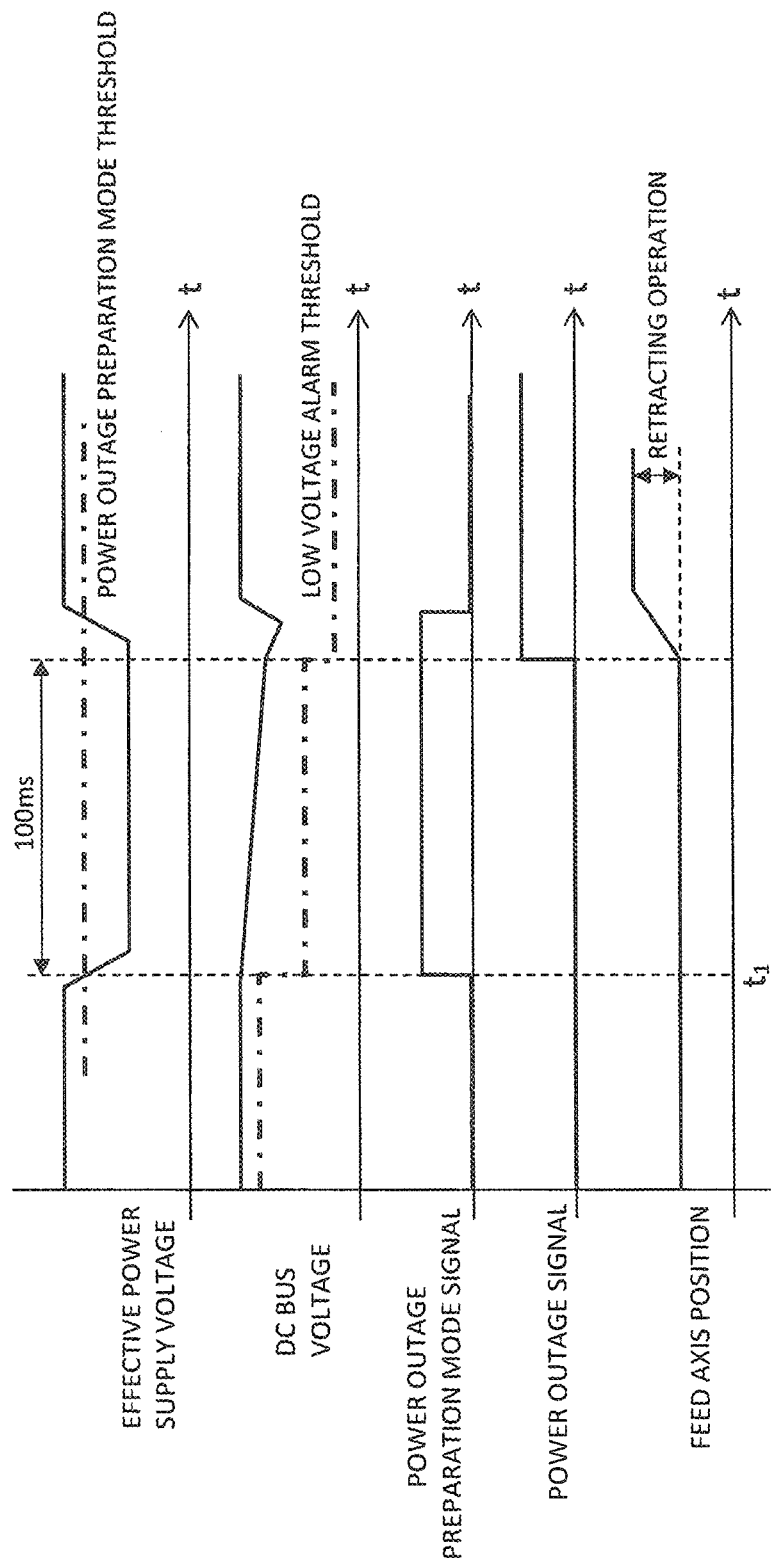
FIG. 2 is a first time chart showing an operation of an embodiment of the present disclosure.

FIG. 2 is a time chart showing an operation of the embodiment of FIG. 1, and shows an operation when the instantaneous voltage reduction is continued for a time period exceeding a predetermined time (for example, 100 ms).

At a time t1, it is detected that the power supply voltage became lower than the power outage preparation mode threshold due to the instantaneous voltage reduction, the power outage preparation mode signal is switched ON, and the threshold $V_{AL2}$ of the low voltage alarm of the DC bus voltage is changed from the value at the normal time to a low value.

In the period in which the instantaneous voltage reduction occurs, the DC bus voltage is reduced by loads of the spindle motor and the feed axis motor. FIG. 2 shows a case where these loads are small, and the DC bus voltage is gradually reduced from the time t1. However, because the threshold $V_{AL2}$ of the low voltage alarm is changed to the low value as described above, the low voltage alarm is not generated.

When a time of 100 ms elapses from the time t1, the power outage judgment unit judges the power outage, and outputs the power outage signal. A factor which determines the time period of 100 ms is retention times of a control circuit power supply and a hydraulic pressure system. When the time exceeds 100 ms, even if the spindle and the feed axis continue the operations, other constituting elements of the machine tool may cause an inappropriate behavior, and thus, the machining is stopped for the purpose of safety. Therefore, this time is not limited to 100 ms, and is suitably set according to the retention times of the control circuit power supply and the hydraulic pressure system.

When the power outage signal is switched ON, the retracting operation of the feed axis is executed. The axis to be retracted is determined according to a positional relationship between the workpiece and the tool, and in general, an axis which operates in an up-and-down direction is retracted upward.

Figure 3:
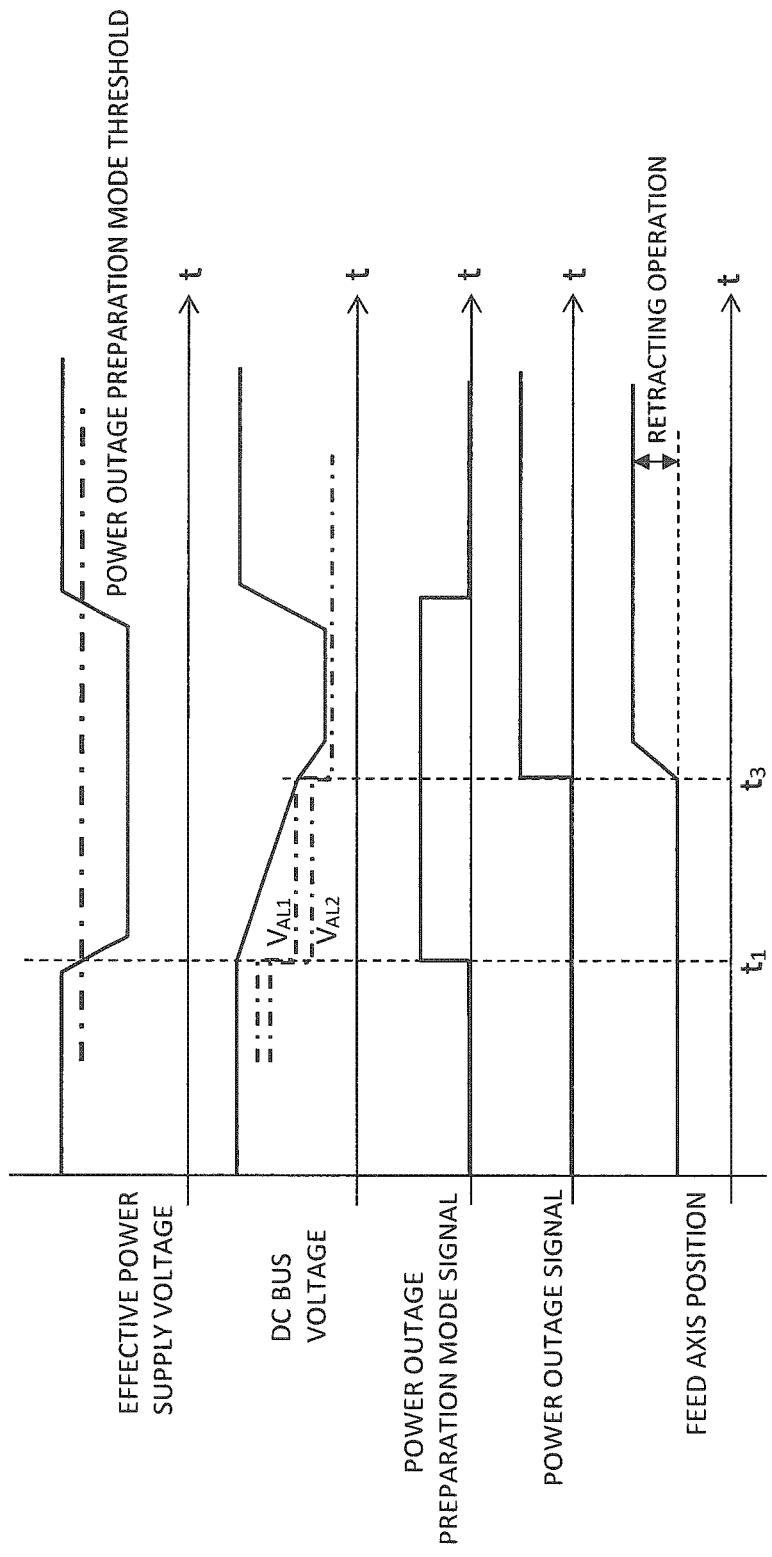
FIG. 3 is a second time chart showing an operation of an embodiment of the present disclosure.

FIG. 3 is a time chart showing an operation in a case where loads of the spindle and the feed axis are large in comparison to the case of FIG. 2, and in which an output limit process of the motor to be described later is not executed. In this example configuration, after the instantaneous voltage reduction occurs at the time t1, the DC bus voltage is reduced by the loads of the spindle and the feed axis, and becomes lower than the threshold $V_{AL1}$ at the power outage judgment unit at a time t3. At this point, the power outage judgment unit judges the power outage, and switches the power outage signal ON. Then, the retracting operation of the feed axis is executed similar to the case of FIG. 2.

Figure 4:
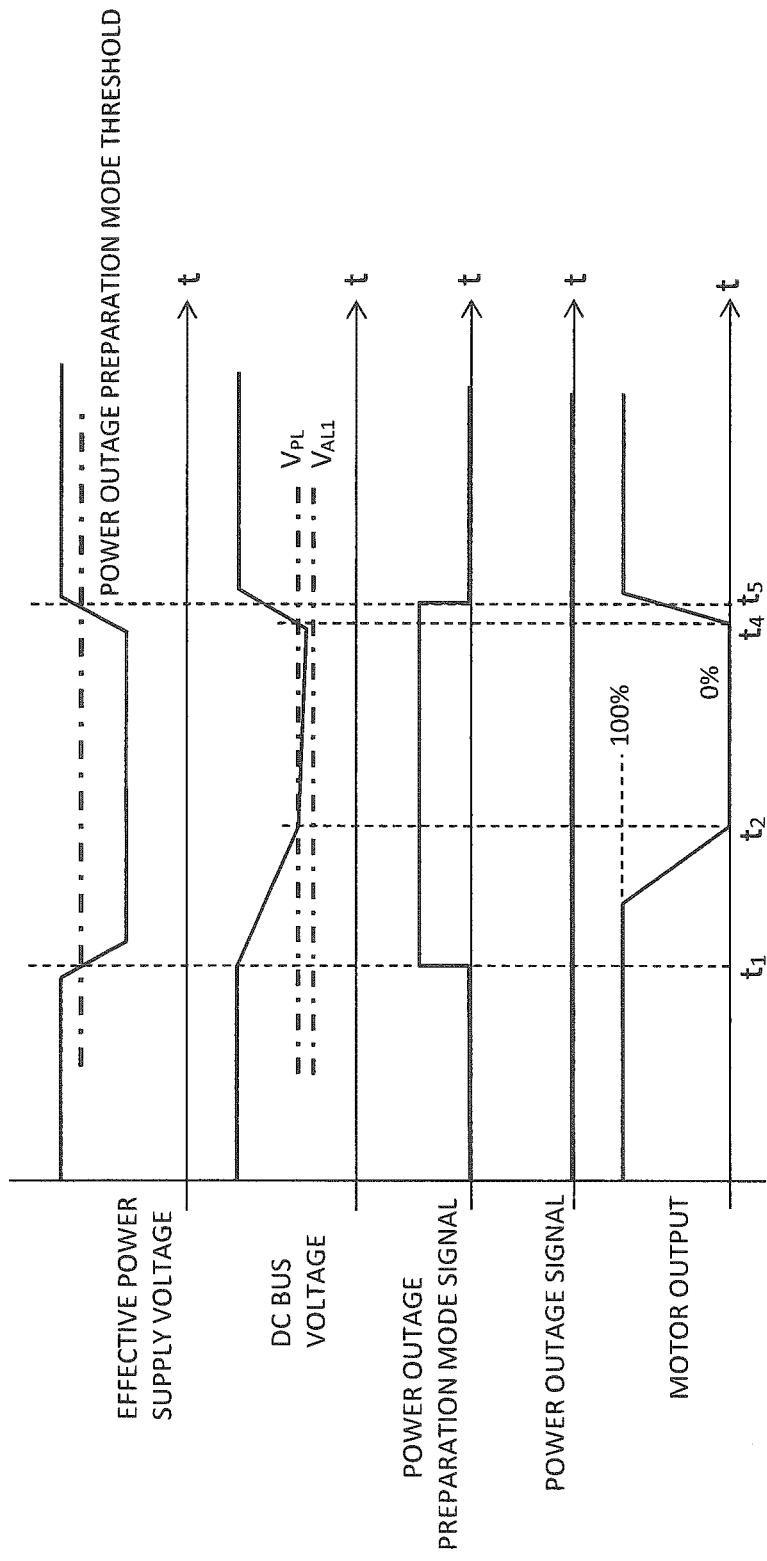
FIG. 4 is a third time chart showing an operation of an embodiment of the present disclosure.

FIG. 4 is an operation time chart for a case in which output limitation of the spindle and feed axis motors is executed according to the DC bus voltage. After the instantaneous voltage reduction occurs at the time t1, the DC bus voltage is reduced by the loads of the spindle and the feed axis. In this example configuration, a limit process of the motor output as will be described below is executed at the inverters 3, 4, and 5 according to the DC bus voltage. Specifically, when a regular motor output is 1.0, an output reduction rate $P_{Lim}$ is calculated, for example, as:

$$P_{Lim}=K_L(V_{DC}-V_{PL})$$

wherein $V_{PL}$ is an output limit voltage, which is set to a value larger than the threshold $V_{AL1}$ of the power outage judgment unit.

With such an output limitation, as the DC bus voltage is reduced in FIG. 4, the motor output is limited, and, when the DC bus voltage reaches $V_{PL}$ at a time t2, the motor output is set to 0. As a result, a power consumption from the DC bus becomes minimal, including the heat generation of the winding of the motor and loss of the inverter, and almost no voltage reduction occurs. Because $V_{PL}$ is set higher than the threshold $V_{AL1}$ of the power outage judgment unit, the operation is continued without judging the power outage. Then, at a time t4, the instantaneous voltage reduction is resolved, and the operation can be returned to the normal operation.

The above-described limitation applies a limit on the motor output, and thus, does not apply a limit on a torque command when the velocity is stopped. Therefore, for example, at an up-and-down axis to which a gravitational load is applied, a retention torque can be maintained even during the output limitation, and dropping due to the force of gravity does not occur.

In the embodiment described above, in one example configuration, the power outage preparation judgment unit 18, the power outage judgment unit 19, and the low voltage alarm judgment units 20a, 20b, and 20c are realized as hardware circuits such as a logical circuit. In another example configuration, the power outage preparation judgment unit 18, the power outage judgment unit 19, and the low voltage alarm judgment units 20a, 20b, and 20c are realized by a computer executing programs describing functions of these parts. The computer used in this configuration has, as hardware, a circuit structure, for example, in which a processor such as a CPU, a memory (primary storage device) such as a random access memory (RAM), a controller which controls an auxiliary storage device such as a flash memory, an SSD (solid state drive), and an HDD (hard disk drive), an interface with various input/output devices, a network interface for controlling connection with a network such as a local area network, or the like are connected via a data transmission path such as, for example, a bus. Programs describing contents of the processes of the functions of these parts are installed on the computer via the network or the like, and are stored in the auxiliary storage device. The program stored in the auxiliary storage device is executed by the processor using the memory, to realize the functions of these parts.

A controller of a machine tool according to the present disclosure can execute a cooperative stopping process by judgment of the power outage by the power outage judgment unit without each of the inverters driving the feed axis and the spindle being stopped by the reduction of the DC bus voltage during a period in which the instantaneous voltage reduction occurs. In addition, the AC voltage detection circuit monitors the voltage of the AC power supply which is input to the converter, and the operation returns to the normal operation without judging the power outage when the instantaneous voltage reduction is resolved. Because of this, the machining can be continued without interruption.

Further, because the DC bus voltage which is input to each inverter is monitored by the second DC voltage detection circuit and the low voltage alarm judgment unit during a period in which the power supply voltage is normal, excessive heating or the like due to a voltage reduction caused by deficiency of the DC bus wiring or the like can be prevented in advance.

Moreover, because the motor output is limited when the DC bus voltage is reduced to a value close to the threshold $_{AL1}$ during the period in which the instantaneous voltage reduction occurs, the reduction of the DC bus voltage can be suppressed, and the operation can be returned to the normal operation after the AC power supply voltage is recovered.

The invention claimed is:

1. A controller of a machine tool, comprising:
   a converter that converts an alternating current power supply voltage to a direct current voltage and that outputs the converted voltage to a direct current bus;
   a plurality of inverters that convert the direct current voltage which is supplied from the converter into an alternating current and that drive a plurality of feed axis motors and a spindle motor;
   an alternating current voltage detection circuit that detects a voltage value of an alternating current power supply which is input to the converter;

a first direct current voltage detection circuit that detects a direct current voltage which is output from the converter;

a second direct current voltage detection circuit that is provided at each of the plurality of inverters and that detects a direct current voltage which is input;

a low voltage alarm judgment unit that is provided at each of the plurality of inverters and that detects an alarm when a detection value of the second direct current voltage detection circuit becomes lower than a first threshold;

a power outage preparation judgment unit that judges a power outage preparation mode when a power supply voltage value detected by the alternating current voltage detection circuit becomes lower than a predetermined value; and a power outage judgment unit that judges power outage when a detection value of the first direct current voltage detection circuit becomes lower than a predetermined second threshold while the power outage preparation judgment unit judges the power outage preparation mode, or when a state of judgment of the power outage preparation mode is continued for a time period exceeding a predetermined time period, and that commands a stopping operation or a retracting operation of a feed axis to the plurality of inverters, wherein the first threshold at the low voltage alarm judgment unit is switched from a first value during a normal time to a second value lower than the predetermined second threshold at the first direct current voltage detection circuit during a time period in which the power outage preparation judgment unit judges the power outage preparation mode.

2. The controller of machine tool according to claim 1, wherein during a period in which the power outage preparation judgment unit judges the power outage preparation mode, in the plurality of inverters, a motor output is limited to an output reduction rate $P_{Lim}$ given by following Equation (1) according to a difference between a detection value $V_{DC}$ of the second direct current voltage detection circuit and an output limit voltage $V_{PL}$ which satisfies a relationship of $V_{PL} > V_{AL1}$:

$$P_{Lim} = K_L(V_{DC} - V_{PL}) \qquad (1)$$

wherein $0 \leq P_{Lim} \leq 1$ and $K_L$ is an arbitrary constant.

* * * * *